United States Patent
Shoykhet

(10) Patent No.: US 9,258,614 B2
(45) Date of Patent: Feb. 9, 2016

(54) SYSTEM AND METHOD FOR RESOLVING SCHEDULING CONFLICTS IN MULTI-TUNER DEVICES AND SYSTEMS

(71) Applicant: Time Warner Cable Enterprises LLC, New York, NY (US)

(72) Inventor: Vitaly Shoykhet, Broomfield, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 13/835,584

(22) Filed: Mar. 15, 2013

(65) Prior Publication Data

US 2014/0282741 A1    Sep. 18, 2014

(51) Int. Cl.
| | |
|---|---|
| *G06F 3/00* | (2006.01) |
| *G06F 13/00* | (2006.01) |
| *H04N 5/445* | (2011.01) |
| *H04N 7/173* | (2011.01) |
| *H04N 21/472* | (2011.01) |
| *H04N 21/458* | (2011.01) |
| *H04N 5/782* | (2006.01) |
| *H04N 21/426* | (2011.01) |
| *H04N 21/433* | (2011.01) |

(52) U.S. Cl.
CPC ......... *H04N 21/47214* (2013.01); *H04N 5/782* (2013.01); *H04N 21/4263* (2013.01); *H04N 21/4334* (2013.01); *H04N 21/4583* (2013.01)

(58) Field of Classification Search
USPC .................... 725/38, 58, 93, 97, 116, 133
See application file for complete search history.

(56) References Cited

U.S. PATENT DOCUMENTS

| | | | | |
|---|---|---|---|---|
| 7,640,564 | B2 * | 12/2009 | Green et al. ................. | 725/58 |
| 7,743,398 | B2 * | 6/2010 | DeYonker et al. .............. | 725/58 |
| 8,528,024 | B2 * | 9/2013 | Schwesinger et al. .................. | H04N 5/44543 386/292 |
| 8,582,957 | B2 * | 11/2013 | Taxier et al. ................... | 386/291 |
| 2009/0263101 | A1 * | 10/2009 | Rudolph et al. ................ | 386/92 |
| 2011/0179453 | A1 * | 7/2011 | Poniatowski ......... | G06F 3/0482 725/58 |

* cited by examiner

*Primary Examiner* — Pinkal R. Chokshi
*Assistant Examiner* — Alexander Gee
(74) *Attorney, Agent, or Firm* — The Marbury Law Group, PLLC

(57) ABSTRACT

A system and method for resolving scheduling conflicts in multi-tuner devices. A multi-tuner device generates an interactive graphical display representing a current schedule for tuner usage. A user may identify a program for viewing or recording and conditionally reserve a tuner to provide the requested service. The multi-tuner device identifies any scheduling conflicts arising from the requested service and provides an updated graphical display showing a new schedule for tuner usage, which schedule is subject to selection by the requesting user. Upon selection of the new schedule, the new schedule becomes the current schedule.

14 Claims, 5 Drawing Sheets

SYSTEM AND METHOD FOR RESOLVING SCHEDULING CONFLICTS IN MULTI-TUNER DEVICES AND SYSTEMS

BACKGROUND

Video content may be delivered to homes and businesses over various media, including fiber, wireless and hybrid-fiber cable. Subscribers of video delivery services not only desire a broad menu of content but the ability to determine when that content will be watched. Digital video recorder (DVR) functionality, which may be incorporated into a video terminal device (VTD) or gateway, provides subscribers the ability to record programs for delayed viewing. The scheduling of a DVR is typically accomplished via a graphical user interface (GUI) that receives commands issued to the DVR by the subscriber or by subscriber interaction with an interactive program guide (IPG).

A VTD may have multiple tuners that are accessible to the DVR. The multiple tuners allow a DVR to record more than one program, provide picture-in-picture functionality and/or allow a subscriber to watch one program while recording another.

However, even with multiple tuners, conflicts may occur when programs with the same or overlapping time slots are selected for recording. FIG. 5 illustrates a typical problem:

In this example, a subscriber desires to record new program E. The recording of program E would, however, conflict with scheduled programs A, B, D and C. The subscriber must choose the program or programs to record and the program or programs to cancel. Current logic used in DVR GUIs presents the subscriber only one option at a time. For example, the subscriber may be asked to cancel program A, cancel program C or not record program E. If the subscriber elects to record program E, the DVR scheduling logic will first require the subscriber to cancel the recording of program A. Because canceling program A does not resolve all of the conflicts with recording program E, when the subscriber agrees to cancel program A, the DVR scheduling logic will require the subscriber to cancel program B or to decide not to record program E. The DVR scheduling logic will continue to walk through the conflicts one at time until the conflicts are resolved. The process moves in a single direction. That is, there is no "undo" button to simply reverse a decision regarding a program. If at any time during the process the subscriber decides not to record program E, any programs that were canceled must be rescheduled.

Newer "video gateways" are configured with multiple tuners that may be shared among "tunerless" video termination devices in a subscriber network and with a DVR. In this configuration, conflicts may arise not only among programs scheduled for recording but because of requests from the tunerless VTDs for access to a tuner. The number of tuners used by the tunerless VTDs and the tuners committed to recording programs may exceed the number of tuners of the video gateway.

SUMMARY

Embodiments are directed to systems and methods for resolving conflicts in demands for access to tuners of multi-tuner devices. The conflict resolution capabilities may be made available on a local display or on a computing device via a network to provide remote management of conflicts from a web-based application.

In one embodiment, a subscriber may review recording options before selecting a program to record.

In another embodiment, a multi-tuner video device prompts a subscriber when demand for access to tuners exceeds, or will exceed, available tuner capacity.

DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

Figure 1:
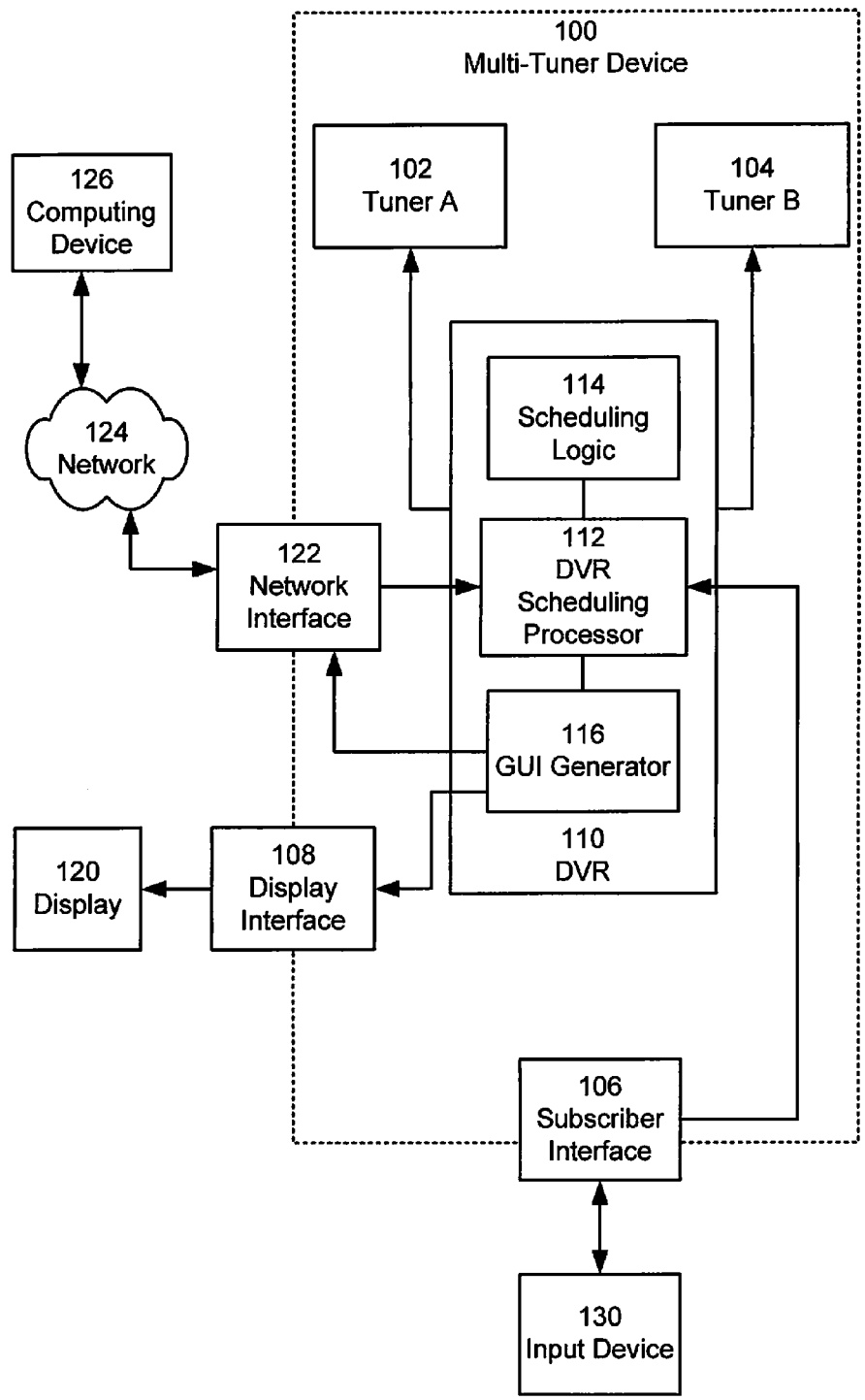
FIG. 1 is a block diagram illustrating a multi-tuner device configured with a program scheduling processor according to embodiments.

FIG. 1 is a block diagram illustrating a multi-tuner device according to embodiments. A multi-tuner device 100 includes tuners A and B (FIG. 1, Blocks 102 and 104 respectively). The two tuners 102 and 104 are accessible to a digital video recorder (DVR) 110. The two tuners 102 and 104 have been illustrated for clarity. The multi-tuner device 100 may be configured with additional tuners that are accessible to the DVR 110.

The DVR 110 is configured with a scheduling processor 112 that receives scheduling logic stored in a memory 114. The memory 114 may be any suitable storage medium and may be programmable as is known in the art.

The DVR is also configured with a subscriber interface 106 for receiving commands from an input device 130. By way of illustration and not by way of limitation, the input device 130 may be a remote control device that communicates with the multi-tuner device 100 via IR, RF or other medium as is known in the art. In an embodiment, the input device 130 is operative to send commands to the DVR after a user of the input device 130 has been authenticated by the multi-tuner device 100. For example, multi-tuner device 100 may require that the subscriber provide a username and a password before being allowed to interact with the DVR 110.

The multi-tuner device 100 comprises a display interface 108 for displaying programs scheduled for recording, menus and other images on a display 120. In particular, the display interface 108 may receive a graphical display from a graphical user interface (GUI) generator 116. In an embodiment, the graphical display is an interactive display that includes regions or locations that may be assigned to particular objects (as described in detail below).

In another embodiment, the multi-tuner device 100 is configured with a network interface 122. In this embodiment, the DVR 110 is accessible to a computing device 126 via a network 124 that connects to network interface 122. The computing device 126 may be a laptop computer, a desktop computer, a smartphone, a tablet or other networked device that includes a display and input devices. By way of illustration and not by way of limitation, the computing device 126 may include a mouse, a keyboard, a touch screen or other input device. The computing device 126 may display programs scheduled for recording, menus and other images generated by the multi-tuner device 100 and the DVR 110. In particular, the computing device 126 may receive an image from a graphical user interface (GUI) generator 116. The computing device 126 may operate an application that facilitates the management of scheduling conflicts from a location that is remote from the multi-tuner device 100 and the DVR 110.

The GUI generator 116 is in communication with the scheduling processor 112. In an embodiment, the GUI generator 116 generates an interactive graphical display that graphically illustrates the programs scheduled for recording on each of the tuners A and B (Blocks 102 and 104 respectively). The generated video display may be displayed on the display 120 via the display interface 108 or on the computing device 126 via the network 124 and the network interface 122. In an embodiment, an object representing the programs scheduled for each of the tuners A and B (Blocks 102 and 104 respectively) is associated with a display location. (See, for example, FIG. 2 and FIG. 3).

The display produced by the GUI generator 116 may be interactive and responsive to input received from the input device 130 via the subscriber interface 106 or from the computing device 126 via the network 124 and the network interface 122.

In an embodiment, the scheduling processor 112 uses the scheduling logic 114 to track programs scheduled for delivery to and recording on the DVR 110 and to identify scheduling conflicts in recording requests made by a subscriber. The GUI generator 116 may generate an interactive display that includes objects representing a current state of a recording schedule and provides the subscriber the opportunity to interact with the DVR scheduling processor 112 to resolve any scheduling conflicts. As noted previously, the objects from tuners A and B (Blocks 102 and 104 respectively) may be associated with particular display locations.

In another embodiment, the graphical display is interactive. For example, an object may be relocated from one display location to another. The relocation may be accomplished using an input device, such as a mouse, a touch sensitive pad or screen or other input device. In an embodiment, the relocation is accomplished by dragging and dropping an object from one location to another. The scheduling processor 112 may be configured to detect a relocation event (such as, for example, a drag and drop event) and to instruct the GUI generator 116 to update the graphical display to reflect a current location of the interactive objects. In an embodiment, when a first object is moved to a display location occupied by a second object, the second object may automatically be relocated to another display location.

Figure 2:
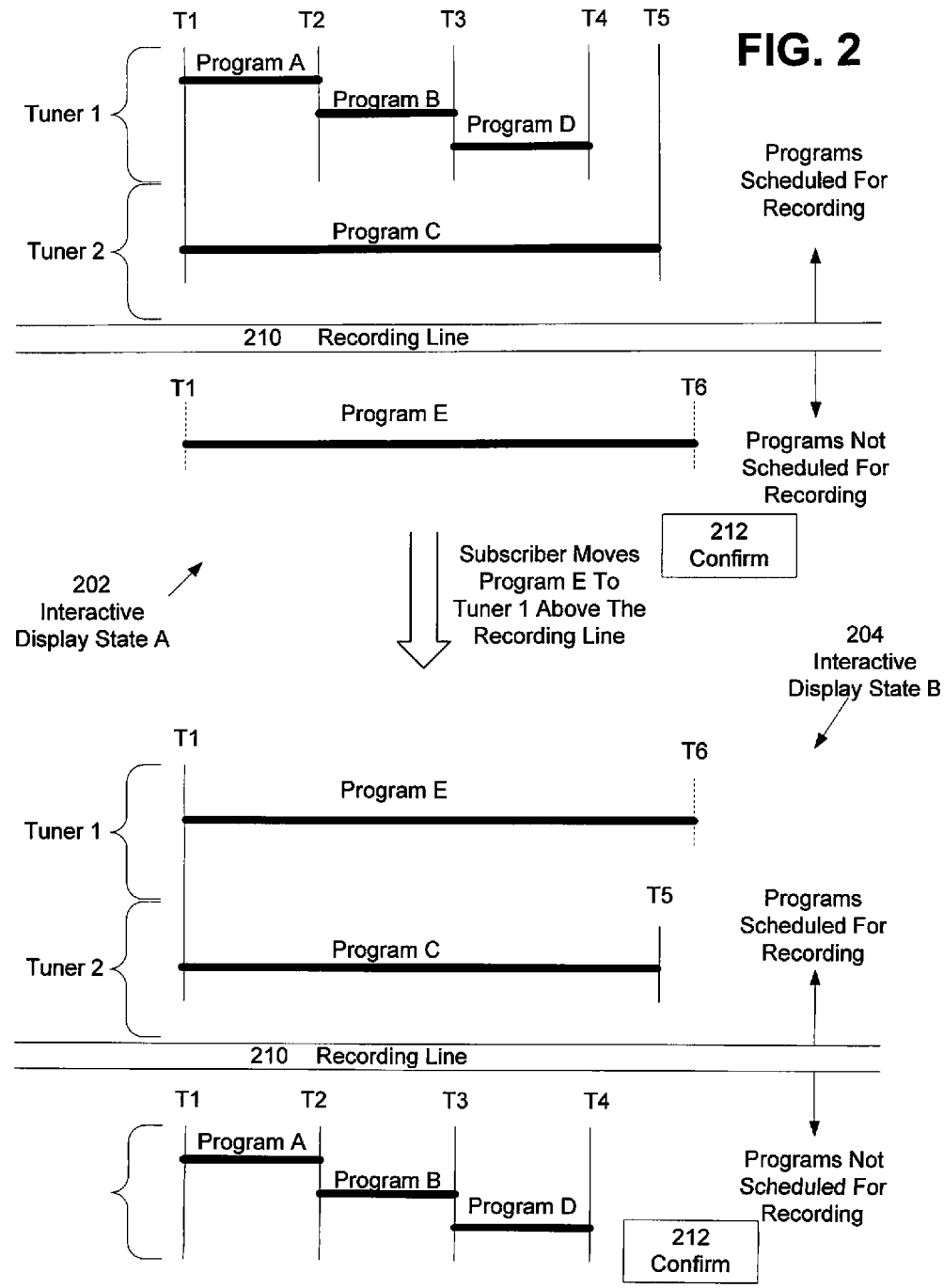
FIG. 2 is a graphical representation of an interactive display illustrating a current state of a recording schedule and a first alternative state according to embodiments.

FIG. 2 is a graphical representation of an interactive display illustrating a current state of a recording schedule and a first alternative state according to embodiments.

In an embodiment, a DVR, such as DVR 110, is configured with a Tuner 1 and Tuner 2. Tuner 1 is associated with a first display location. Tuner 1 has been assigned to record a Program A during a timeslot defined by time T1 and time T2, to record a Program B during a timeslot defined by time T2 and time T3, and to record a Program D during a timeslot defined by time T3 and time T4. Tuner 2 is associated with a second display location. Tuner 2 has been assigned to record a Program C during a timeslot defined by time T1 and time T5. The interactive display 202 represents a state "A" in which objects (for example, lines) represent Programs A, B, C and D, which programs are scheduled for recording using Tuners 1 and 2. The schedule programs are represented as being above a recording object (for example a line) 210. The recording object is associated with a third display location. A "confirm" button 212 is associated with a fourth display location and is grayed-out to represent that interactive display state A (202) is the current state of the DVR.

A subscriber utilizes a subscriber interface of the DVR, such as subscriber interface 106, to view additional programs for recording, such as Program E. In an embodiment, Program E is scheduled for broadcast during a timeslot defined by time T1 and time T6. As illustrated in interactive state A (202), the subscriber has selected an object (for example, a line) representing Program E as a candidate for recording. Because the timeslot assigned to Program E conflicts with the currently scheduled programs A, B, C and D, the subscriber is presented with a graphical display that includes an object for Program E that is associated with a fifth display location representing a time slot that is below the recording line object 210. The graphical display thus provides the subscriber the opportunity to choose the programs for recording.

The subscriber may interact with the display state A 202 to create a temporary new display state B (204) by moving program objects relative to the recording line object 210. The movement of the recording objects may be accomplished using an input device, such as the input device 130 or an input device connected to or incorporated into the computing device 126, that interacts with a subscriber interface (such as subscriber interface 106) of the multi-tuner device 100. For example, the movement of the recording objects may be accomplished using a drag-and-drop process that is detected by the scheduling processor 112.

When the subscriber moves the Program E object to location on the display associated with scheduled programs A, B and D (illustrated as assigned to Tuner 1), the subscriber is electing to record programs E and C. The DVR scheduling processor 112 uses the scheduling logic 114 to move the Programs A, B and D that were assigned to Tuner 1 to a position below the recording line 210. Program C, which is scheduled for recording using Tuner 2, is unaffected by the movement of the Program E object to the location on the display associated with Tuner 1.

The GUI generator 116 generates display state B (204) and displays the state B 204 on the display 120. The "confirm" button 212 is now active (the button is not grayed-out). The subscriber may interact with the button 212 to select the configuration of the DVR represented by interactive display state B (204) as the current state of the DVR.

Figure 3:
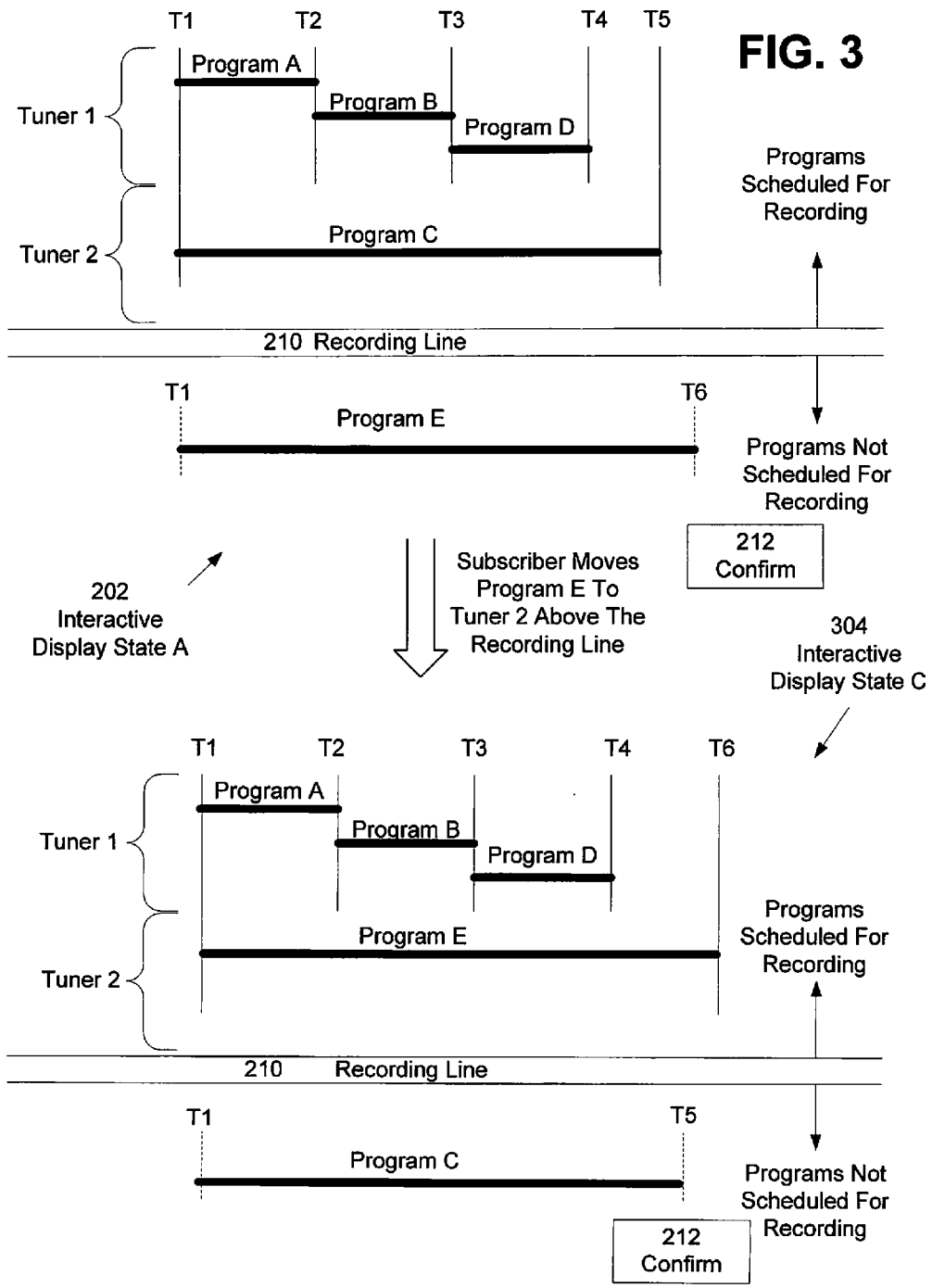
FIG. 3 is a graphical representation of an interactive display illustrating a current state of a recording schedule and a second alternative state according to embodiments.

FIG. 3 is a graphical representation of an interactive display illustrating a current state of a recording schedule and a second alternative state according to embodiments.

As previously described, in the interactive display state A (202) objects (for example, lines) represent Programs A, B, C and D, which programs are scheduled for recording using Tuners 1 and 2. The scheduled programs are represented as being above a recording object (for example a line) 210. A "confirm" button 212 is grayed-out to represent that interactive display state A (202) is the current state of the DVR. The objects are assigned to display locations within the graphical display generated by the GUI generator 116.

A subscriber utilizes a subscriber interface of the DVR, such as subscriber interface 106, to view additional programs for recording, such as Program E. The subscriber may interact with the display state A 202 to create a temporary new display state C (304) by moving program objects relative to the recording line 210. As illustrated in FIG. 3, the subscriber moves the object representing Program E to the location on the display associated with Tuner 2. Programs A, B and D, which are scheduled for recording using Tuner 1, are unaffected by the movement of the Program E object to the location on the display represented by Tuner 2.

When the subscriber moves the Program E object to location on the display associated with schedule program C (illustrated as assigned to Tuner 2), the subscriber is electing to record programs A, B, D and E. The DVR scheduling processor 112 uses the scheduling logic 114 to move Program C that was assigned to Tuner 2 to a position below the recording line 210. The GUI generator 116 generates display state C (304) and displays the state C 304 on the display 120. The "confirm" button 212 is now active (the button is not grayed-out). The subscriber may interact with the button 212 to select the configuration of the DVR represented by interactive display state C (304) as the current state of the DVR.

Figure 4:
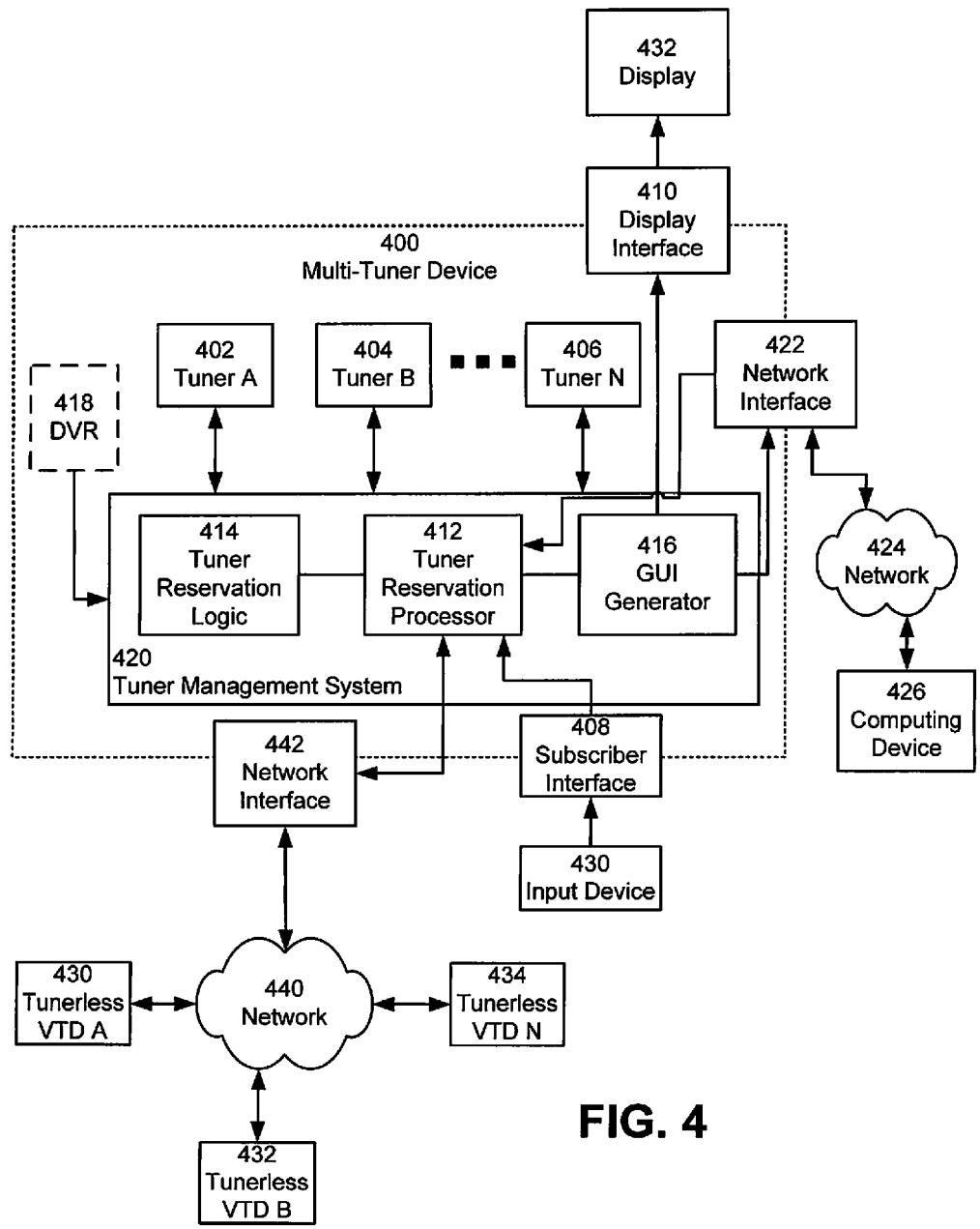
FIG. 4 is a block diagram illustrating a multi-tuner device configured with a tuner management system according to an embodiment.
Figure 5:
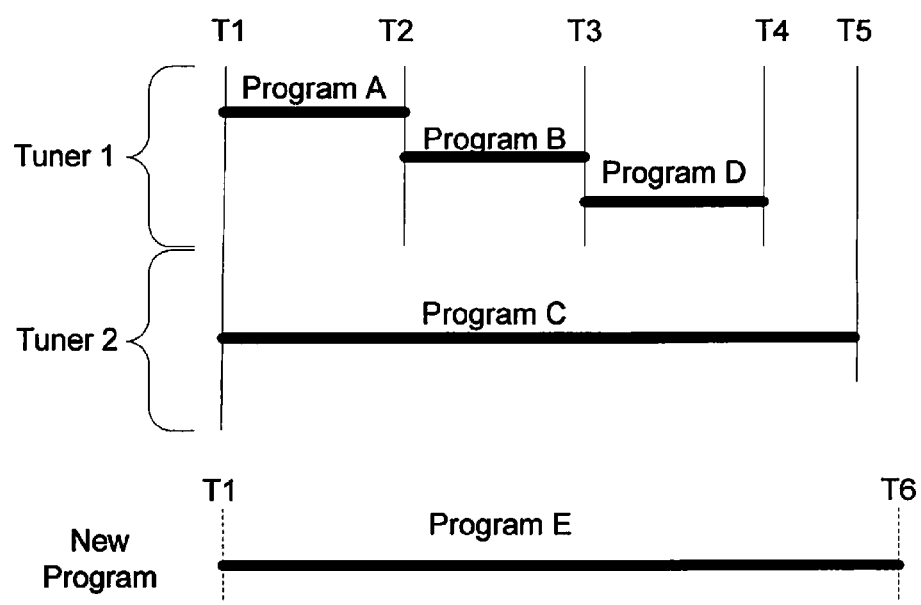
FIG. 5 is a block diagram illustrating a typical scheduling conflict known in the prior art.

FIG. 4 is a block diagram illustrating a multi-tuner device 400 configured with multiple tuners, such as tuners A, B and N (Blocks 402, 404 and 406 respectively), a subscriber interface 408, a display interface 410, a tuner management system 420 and a network interface 442. Optionally, the multi-tuner device 400 may also be configured with a DVR, such as DVR 418. The tuner management system 420 communicates with multiple tunerless VTDs, such as tunerless VTDs A, B and N (Blocks 430, 432 and 434 respectively). Communications between the tuner management system 420 and the tunerless VTDs 430, 432 and 434 may be performed over a network, such as network 440, via the network interface 442. The tuner management system 420 may also communicate with the optional DVR 418.

The tuner management system 420 is configured with a tuner reservation processor 412 that receives scheduling logic stored in a memory 414. The memory 414 may be any suitable storage medium and may be programmable as is known in the art.

In an embodiment, the multi-tuner device 400 is configured with a subscriber interface 408 for receiving commands from an input device 430. By way of illustration and not by way of limitation, the input device 430 may be a remote control device that communicates with the multi-tuner device 400 via IR, RF or other medium as is known in the art. In an embodiment, the input device 430 is operative to send commands to the multi-tuner device 400 after a user of the input device 430 has been authenticated by the multi-tuner device 400. For example, multi-tuner device 400 may require that the subscriber provide a username and a password before being allowed to interact with the multi-tuner device 400.

The multi-tuner device 400 comprises a display interface 410 for displaying programs scheduled for recording, menus and other images on a display 432. In particular, the display interface 410 may receive a graphical display from the GUI generator 416. In an embodiment, the graphical display is an interactive display that includes regions or locations that may be assigned to particular objects (as described in detail below).

In another embodiment, the multi-tuner device 400 is configured with a network interface 422. In this embodiment, the tuner management system 420 and optional DVR 418 are accessible to a computing device 426 via a network 424 that connects to network interface 422. The computing device 426 may be a laptop computer, a desktop computer, a smartphone, a tablet or other networked device that includes a display and input devices. By way of illustration and not by way of limitation, the computing device 426 may include a mouse, a keyboard, a touch screen or other input device. The computing device 426 may display programs scheduled for recording on optional DVR 418, channels and the tunerless VTDs 430, 432 and 434 assigned to tuners A, B and N (Blocks 402, 404 and 406 respectively), the status of the tunerless VTDs 430, 432 and 434, menus and other images generated by the multi-tuner device 400. In particular, the computing device 426 may receive a graphical display from the GUI generator 416. The computing device 426 may operate an application that facilitates the management of scheduling conflicts from a location that is remote from the multi-tuner device 400 and the optional DVR 418.

A tuner may be assigned to provide a video signal to the optional DVR 418 and a tunerless VTD, such as one of tunerless VTDs A, B and N (Blocks 430, 432 and 434 respectively). A conflict arises when the number of requests for video signals exceeds the number of tuners.

The tuner management system 420 is configured to resolve the demands for tuner resources. The tuner reservation processor 412 uses the reservation logic 414 to track current requests for tuner resources and requests for tuner resources for a time period that occurs in the future. The GUI generator 416 may generate an interactive graphical display that provides the requesting subscriber (or a subscriber with administrative authority over the multi-tuner device 400) a current state of each of the tuners A, B and N (Blocks 402, 404 and 406 respectively) and provides the requesting subscriber or the administrator the opportunity to interact with the tuner reservation processor 412 to resolve any schedule conflicts. The generated video display may be displayed on the display 432 via the display interface 410 or on the computing device 426 via the network 424 and the network interface 422. The display produced by the GUI generator 416 may be interactive and responsive to input received from the input device 430 via the subscriber interface 408 or from the computing device 426 via the network 424 and the network interface 422.

In an embodiment, the tuner reservation processor 412 uses the tuner reservation logic 414 to track programs scheduled for delivery by one of tuners A, B through N (Blocks 402, 404 and 406 respectively) and to identify scheduling conflicts in requests for programs made by a subscriber. The GUI generator 416 may generate an interactive display that includes objects representing a current state of scheduled tuner resources and provides the subscriber the opportunity to interact with the tuner reservation processor 412 to resolve any schedule conflicts. As noted previously, the objects from tuners A and B through N (Blocks 402, 404 and 406 respectively) may be associated with particular display locations.

In another embodiment, the graphical display is interactive. For example, an object may be relocated from one display location to another. The relocation may be accomplished using an input device, such as a mouse, a touch sensitive pad or screen or other input device. In an embodiment, the relocation is accomplished by dragging and dropping an object from one location to another. The tuner reservation processor 412 may be configured to detect may be configured to detect a relocation event (such as, for example, a drag and drop event) and to instruct the GUI generator 416 to update the graphical display to reflect a current location of the interactive objects. In an embodiment, when a first object is moved to a display location occupied by a second object, the second object may automatically be relocated to another display location.

For example, a video signal from tuner A (Block 402) may be actively providing a video signal to display device 432 while tuner B (Block 404) is providing a video signal to the tunerless VTD A (Block 430). Tuners C (not illustrated) through N (Block 406) may be committed to providing a video signal to the optional DVR 418. Assuming that all of the tuners of the multi-tuner device 400 are committed, a request for a video signal from tunerless VTD B (Block 432) creates a conflict that may be resolved by the tuner management system 420 by:

(A) Denying the request of tunerless VTD B while offering the requesting subscriber the option of watching a program which is being carried by one of the tuners which will be carried at a future time.

(B) Granting tunerless VTD B's request and redirecting a tuner being used by another device to VTD B. The redirecting of a tuner from one device to another device may be based on a priority ranking assigned to the requesting device or assigned to the requesting subscriber.

(C) Displaying a list of devices that have reserved tuner resources to the requesting subscriber and allowing the requesting subscriber to manually resolve the conflict among devices. In an embodiment, the requesting subscriber may resolve the conflict using the drag-and-drop process as previously described.

(D) Displaying a list of devices that have reserved tuner resources to an administrator and allowing the administrator to manually resolve the conflict among devices.

The processors 112 and 412 may be any programmable microprocessor, microcomputer or multiple processor chip or chips that can be configured by software instructions (applications) to perform a variety of functions, including the functions of the various embodiments described above. In some mobile receiver devices, multiple processors may be provided, such as one processor dedicated to wireless communication functions, one processor dedicated to video processing, and one processor dedicated to running other applications. Typically, software applications may be stored in the internal memory, such as memory 114 and 414, before they are accessed and loaded into the processors 112 and 412 respectively. The processors 112 and 412 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as hardware, software, or any combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

Embodiments implemented in computer software may be implemented in software, firmware, middleware, microcode, hardware description languages, or any combination thereof. A code segment or machine-executable instruction may represent a procedure, a function, a subprogram, a program, a process, a task, a tread, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media includes both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a signal processing circuit that may be suitable for use in a wireless receiver or mobile device. Such a wireless signal processing circuit may include circuits for accomplishing the signal measuring and calculating steps described in the various embodiments.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of resolving scheduling conflicts in a multi-tuner device, the method comprising:
    scheduling by the multi-tuner device a first program for recording during a first time period by a first tuner, wherein the multi-tuner device manages access to a plurality of tuners including the first tuner by a plurality of tunerless devices;
    scheduling by the multi-tuner device a second program for recording during a second time period by a second tuner in the plurality of tuners;
    receiving by the multi-tuner device a request to record a third program during a third time period;
    detecting by the multi-tuner device a conflict when recording of the third program during the third time period would permit recording either the first program or the second program, wherein the conflict arises when the plurality of tunerless devices are accessing all of the plurality of tuners except for the first tuner and the second tuner during the third time period;
    displaying by the multi-tuner device in response to the detected conflict a graphical display on a display device, wherein the graphical display comprises a first display location, a second display location and a third display location;
    generating by the multi-tuner device a first object representing the first program and assigning the first object to the first display location;
    generating by the multi-tuner device a second object representing the second program and assigning the second object to the second display location;
    generating by the multi-tuner device a third object representing the third program and assigning the third object to the third display location;
    displaying by the multi-tuner device a first option to drag and drop the third object from the third display location to the second display location in order to schedule recording of the third program and cancel recording of the second program;
    displaying by the multi-tuner device a second option to provide a program through an available tuner in the plurality of tuners at a future time;
    detecting by the multi-tuner device a selection of the second option; and
    canceling by the multi-tuner device the request to record the third program and providing the program through the available tuner at the future time in response to detecting the selection of the second option.

2. The method of claim 1, wherein the multi-tuner device is one of a video termination device, a video gateway device, a digital video recording device and a tunerless video termination device.

3. The method of claim 1, wherein detecting by the multi-tuner device the selection of the second option comprises receiving by the multi-tuner device an input from an input device in communication with the multi-tuner device.

4. The method of claim 1, wherein detecting by the multi-tuner device the selection of the second option comprises receiving by the multi-tuner device an input from a computing device in communication with the multi-tuner device via a network.

5. The method of claim 4, wherein the network is the Internet.

6. The method of claim 4, wherein the computing device is one of a desktop computer, a laptop computer, a tablet and a smartphone.

7. The method of claim 1, wherein displaying by the multi-tuner device the graphical display on a display device comprises displaying the updated graphical display on one of a television display and a display of a computing device.

8. A system for resolving scheduling conflicts in multi-tuner devices, the system comprising:
    a display device;
    an input device;
    a plurality of tunerless devices;
    a plurality of tuners including a first tuner and a second tuner; and
    a multi-tuner device configured to manage access to the plurality of tuners by the plurality of tunerless devices, comprising a processor configured with processor-executable instructions to perform operations comprising:
        scheduling a first program for recording during a first time period by the first tuner;
        scheduling a second program for recording during a second time period by the second tuner;
        receiving a request to record a third program during a third time period;
        detecting a conflict when recording of the third program during the third time period would permit recording either the first program or the second program, wherein the conflict arises when the plurality of tunerless devices are accessing all of the plurality of tuners except for the first tuner and the second tuner during the third time period;
        displaying in response to the detected conflict a graphical display on the display device, wherein the graphical display comprises a first display location, a second display location and a third display location;
        generating a first object representing the first program and assigning the first object to the first display location;
        generating a second object representing the second program and assigning the second object to the second display location;
        generating a third object representing the third program and assigning the third object to the third display location;
        displaying a first option to drag and drop the third object from the third display location to the second display location in order to schedule recording of the third program and cancel recording of the second program;

displaying a second option to provide a program through an available tuner in the plurality of tuners at a future time;

detecting a selection of the second option; and canceling the request to record the third program and providing the program through the available tuner at the future time in response to detecting the selection of the second option.

9. The system of claim 8, wherein the multi-tuner device is one of a video termination device, a video gateway device, a digital video recording device and a tunerless video termination device.

10. The system of claim 8, wherein the input device is in communication with the multi-tuner device, and wherein the processor is configured with processor-executable instructions such that detecting the selection of the second option comprises receiving input from the input device.

11. The system of claim 8, wherein the input device is in communication with a computing device that is in communication with the multi-tuner device via a network, and wherein the processor is configured with processor-executable instructions such that detecting the selection of the second option comprises receiving input from the computing device via the network.

12. The system of claim 11, wherein the network is the Internet.

13. The system of claim 11, wherein the computing device is one of a desktop computer, a laptop computer, a tablet and a smartphone.

14. The system of claim 8, wherein the display device is one of a television display and a display of a computing device.

\* \* \* \* \*